Figure 1:
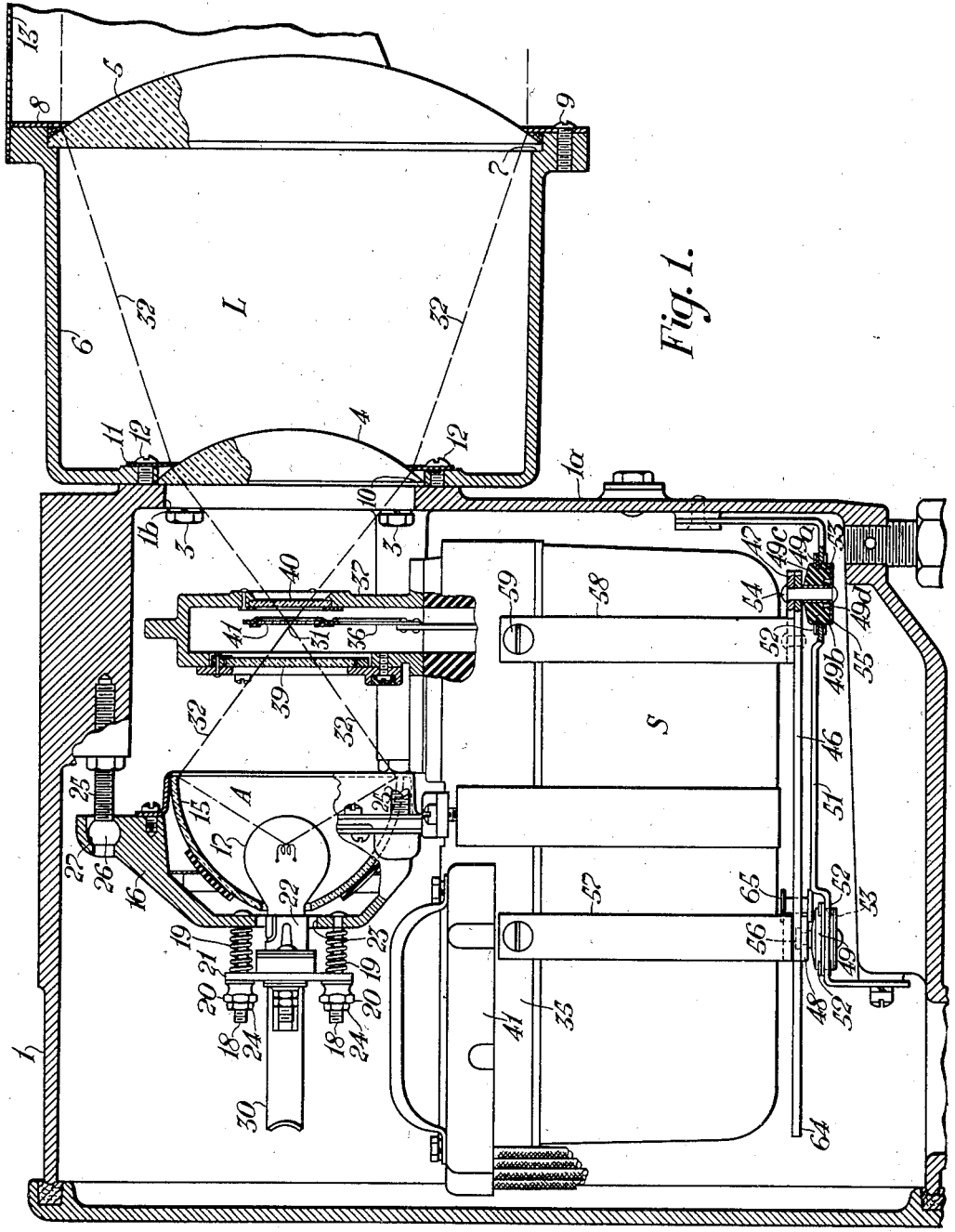

Nov. 9, 1943.    W. B. WELLS    2,333,967
LIGHT SIGNAL
Filed March 7, 1941    2 Sheets-Sheet 1

INVENTOR
Wesley B. Wells
BY
HIS ATTORNEY

Nov. 9, 1943.                    W. B. WELLS                    2,333,967
                                 LIGHT SIGNAL
                            Filed March 7, 1941              2 Sheets-Sheet 2
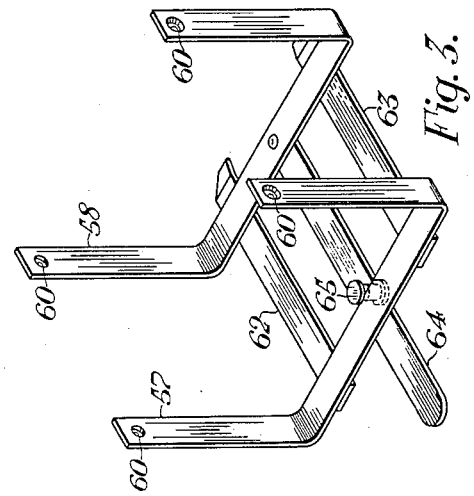
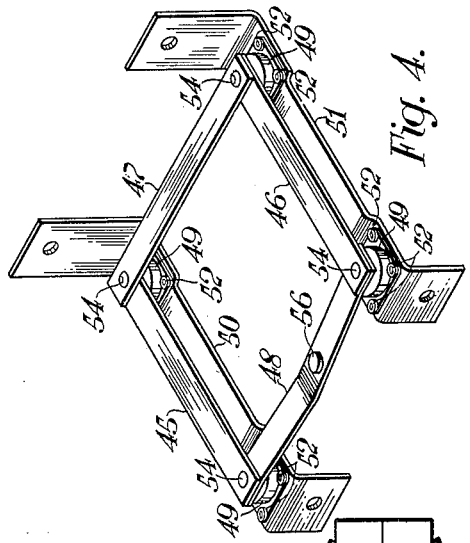
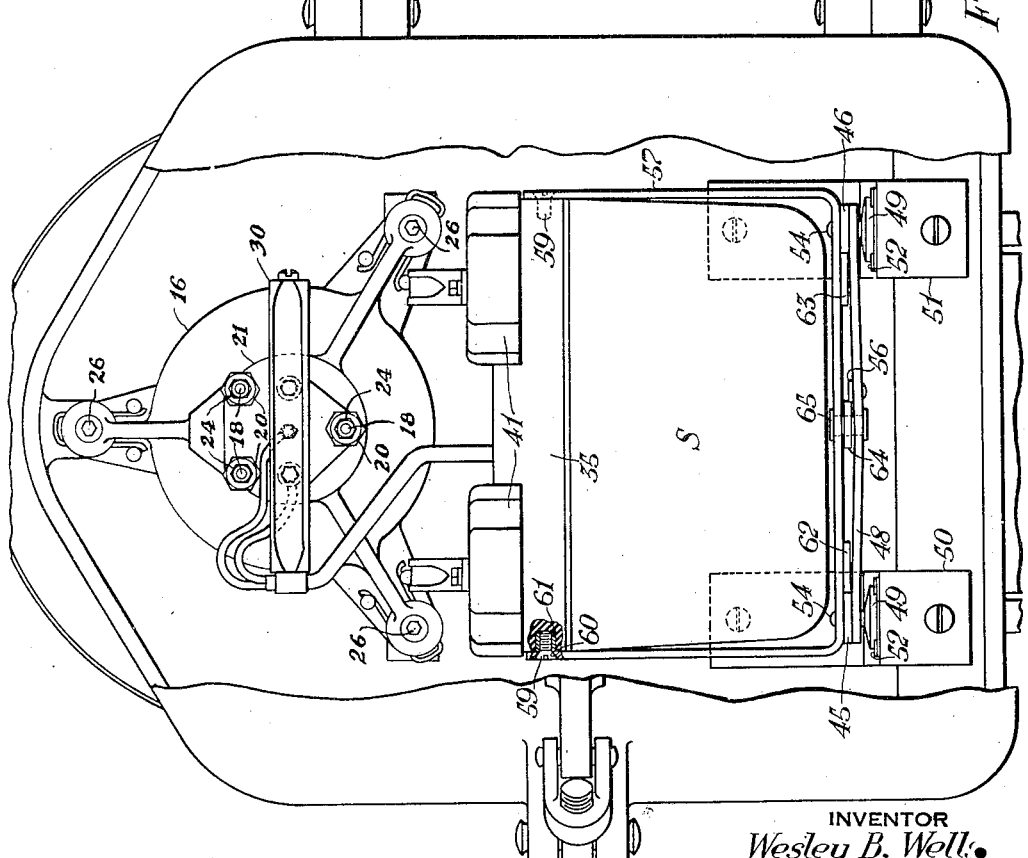
INVENTOR
Wesley B. Wells.
BY
HIS ATTORNEY Patented Nov. 9, 1943

2,333,967

UNITED STATES PATENT OFFICE 2,333,967

LIGHT SIGNAL

Wesley B. Wells, Wilkinsburg, Pa., assignor to The Union Switch & Signal Company, Swissvale, Pa., a corporation of Pennsylvania Application March 7, 1941, Serial No. 382,193

3 Claims. (Cl. 177—329)

My invention relates to light signals, and particularly to searchlight signals which are capable of selectively projecting a plurality of beams of light of different colors from a single light source.

In one form of searchlight signal commonly used on railroads, such for example, as that disclosed in my prior Patent No. 2,230,853, granted on February 4, 1941, for Light signals, the signal includes a lens system for projecting a beam of parallel rays of light rigidly secured to a signal case in advance of an opening formed in the forward wall of the case, a light projecting unit detachably secured within the case and including a reflector having conjugate foci one of which is disposed at the light source and the other of which coincides with the focal point of the lens unit, and an operating unit rigidly secured within the signal case and including a spectacle arm carrying a plurality of color filters and a motor element for selectively moving the spectacle arm to different positions in each of which a different one of the color filters is interposed in the beam from the light unit at the common focal point of the light and lens units. The operating unit also includes contact mechanism operated by the motor element for controlling similar signals, relays, or other apparatus. The signals are sometimes mounted in locations where they are subjected to severe vibration, and under certain adverse conditions sufficient vibration has been transmitted to the operating unit to cause excessive wear on the pivots or other moving parts of the mechanism, and to at times vibrate open the back contacts. This is undesirable, and one object of my invention is the provision in a signal of the type described of improved means for mounting the operating unit in the signal case, whereby the undesirable effects of vibration are eliminated, and removal of the mechanism for inspection or repair is greatly facilitated.

According to my invention, I take advantage of the fact that the areas of the color filters are considerably larger than the area of the light beam passing through them whereby, if the light and lens units are accurately positioned in the case, it is not necessary to have the operating unit accurately located in the case. In other words, sufficient movement of the operating unit can be permitted with reference to the case to enable the operating unit to be effectively mounted on shock absorbing supports without materially affecting the optical efficiency of the signal.

Other objects and characteristic features of my invention will become apparent as the description proceeds.

I shall describe one form of light signal embodying my invention, and shall then point out the novel features thereof in claims.

In the accompanying drawings, Fig. 1 is a vertical sectional view showing one form of light signal embodying my invention. Fig. 2 is a rear elevational view of the signal shown in Fig. 1, a portion of the door being broken away to better illustrate the construction of the parts. Figs. 3 and 4 are perspective views of certain parts of the signal shown in Figs. 1 and 2.

Similar reference characters refer to similar parts in each of the several views.

Referring first to Figs. 1 and 2, the light signal in the form here shown comprises a box-like casing 1, the forward wall 1a of which is provided with a large circular opening 1b through which the light rays from a light unit A disposed inside of the casing are adapted to be projected. Secured to the forward wall 1a directly in front of the opening 1b by means of four screws 3 spaced 90° apart is a lens unit L for concentrating the light rays emitted by the light unit A into a signal beam. The lens unit L is of well-known construction and comprises a doublet consisting of two spaced lenses 4 and 5 mounted in the inner and outer ends, respectively, of a tubular casing 6, commonly referred to as a lens barrel. The outer lens 5 bears around its edge against the bottom of an annular groove 7 which is formed in the lens barrel, and is held in place by a ring member 8 and screws 9, a gasket of felt or the like preferably being interposed between the ring member and the edge of the lens. The inner lens 4 likewise bears at its edges against the bottom of an annular groove 10 which is formed in the inner end of the lens barrel, and is held in place by a ring member 11 and screws 12, a gasket of felt or the like (not shown) being interposed between the ring member and the edges of the lens. The two lenses are of the well-known plano-convex type, and are both clear or colorless. Secured to the outer end of the lens barrel directly above the outer lens 5 is a hood 13 which performs the usual function of shielding the lens 5 from the direct rays of the sun.

The light unit A referred to hereinbefore comprises an elliptical reflector 15 mounted in a metal casing 16, and an electric lamp 17, the filament of which is located at one of the conjugate foci of the reflector 15. The rear wall of the casing 16 is provided with three rearwardly projecting studs 18 arranged in triangular formation, only two of which are visible in the drawings, and mounted on these studs between compressed coil springs 19 which surround the shank portions of the studs, and nuts 20 which are adjustably screwed onto the outer ends of the studs, is a plate 21. This plate carries a socket 22 which projects with some clearance through a hole 23 formed in the rear wall of the casing 16, and serves as a support for the previously referred to electric lamp 17. Mounted on the studs 18 outside of the nuts 20 are lock nuts 24 for securing the nuts 20 in adjusted positions. It will be apparent that by adjusting the nuts 20 in the position of the lamp filament with respect to the reflector may be varied, and these nuts are so adjusted that the filament of the lamp will be located exactly at the inner focal point of the reflector, thus enabling the maximum efficiency to be obtained from the light unit.

The light unit is removably secured to the interior of the signal casing 1 by snap fastening means including three adjustable studs 25 having spherical heads 26 which fit into spherical sockets 27 formed in radial arms provided on the reflector housing, and which heads are held in place in the sockets by spring means not shown. The detail construction and arrangement of these snap fastening means form no part of my present invention, and are described in full in my prior Patent No. 2,230,853 referred to hereinbefore. For purposes of my present invention, it is believed to be sufficient to state that these means permit the light unit as a whole to be removed by grasping a handle 30 secured thereto and pulling the unit rearwardly, and that after the unit has been removed it can readily be snapped back in place. The studs 25 are so adjusted that the outer focal point 31 of the reflector will coincide exactly with the focal point of the lens unit L, as shown by the dash lines 32 defining the limits of the beam of light emitted by the lamp 17.

The light signal also comprises a suitable operating mechanism S for changing the color of the beam emitted by the signal to provide a plurality of signal indications. As here shown, this mechanism is similar to that disclosed and claimed in Letters Patent of the United States No. 2,172,724, granted to myself and another on September 12, 1939, for Light signals. Briefly described, this mechanism comprises a top plate 35 of insulating material having secured thereto a polarized electroresponsive motor means for operating between an intermediate and two extreme positions, a spectacle arm 36 which projects upwardly through a slot in the top plate into an auxiliary casing 37 which is secured to the top plate. The spectacle arm 36 is provided at its upper end with green, yellow and red color screens or filters which align respectively with two windows 39 and 40 of clear glass according as the spectacle arm occupies its one extreme position, its other extreme position or an intermediate position midway between its two extreme positions. Only the red screen 41 is shown in the drawings, but spectacle arms of the type described are well known, and it is therefore deemed to be unnecessary to show this spectacle arm in detail herein.

The operating mechanism also comprises suitable contact mechanism not shown, operated by the motor means for controlling similar signals, relays or other apparatus forming part of a complete signal system.

The operating mechanism is removably secured within the casing 1 by mounting means which I shall describe presently, and is so positioned with respect to the casing that the light rays emitted by the light unit A will pass through the windows 39 and 40 on opposite sides of the common focal point of the light and lens units and will pass through that color screen which happens to be in alignment with the windows 39 and 40 substantially at the common focal point of the light and lens units, in the manner indicated by the dot and dash lines 32. It will be apparent, therefore, that the signal will display a green, red or yellow aspect according as the spectacle arm 36 occupies its one extreme position, its intermediate position, or its other extreme position.

The top plate 35 of the operating mechanism is provided with suitable terminal posts for the reception of plug connectors 41 to enable the signal to be readily connected with external circuits.

Heretofore, in signals of the type described it has been customary to rigidly support the operating mechanism in the casing 1. When the operating mechanism is rigidly supported in the casing 1, however, any vibration to which the signal is subjected is transmitted to the operating mechanism; and under certain adverse conditions, such for example, as when the signal is supported on a pole and the ground is frozen, or when the signal is used on elevated roads, the vibration transmitted to the operating mechanism has been sufficiently severe to greatly accelerate wear of the pivots and moving parts, and also to at times vibrate open the back contacts. It is desirable to minimize insofar as possible the effects of vibration on the operating mechanism, and, in accordance with my present invention, I accomplish this result by providing new and improved mounting means for mounting the operating mechanism in the casing, which mounting means includes suitable shock absorbing devices for preventing the transmission of vibration from the signal casing to the operating mechanism, and which at the same time permits the operating mechanism to be removed from the casing for inspection and repair more readily and more quickly than has heretofore been possible. This mounting means is made practicable by the fact that the color screens carried by the spectacle arm are considerably larger in diameter than the area of the signal beam where it passes through the color screens, and since the other optical parts of the signal are all accurately positioned within the casing 1, it is not necessary to have the operating mechanism rigidly held in place in the signal casing. That is to say, some movement of the operating mechanism can be permitted with reference to the casing 1 without affecting the optical efficiency obtained from the signal.

The mounting means embodying my present invention comprises a track assembly attached to the casing 1, and a cooperating supporting framework attached to the operating mechanism S.

The track assembly in the form here shown (see Fig. 4) comprises side rails 45 and 46 and front and rear crosspieces 47 and 48 arranged in rectangular formation and resiliently supported at their ends by means of shock absorbing supports 49 secured to laterally spaced supporting brackets 50 and 51. The front crosspiece 47 is disposed above the side rails 45 and 46, while the rear crosspiece 48 is disposed below the side rails for a purpose which will appear hereinafter.

The shock absorbing supports 49 may have any suitable construction, but as here shown they are of the rubber shear type, and each comprises a rectangular metal plate 49a (see Fig. 1) provided with a central hole 49b through which a cylindrical block of rubber 49c extends. The rubber block projects outwardly past the inner edge of the plate 49a above and below the plate and is bonded to the plate at its contiguous portions. Each support 49 also includes a metal sleeve 49d which extends through the center of the rubber block and is bonded to the contiguous portions of the block. Each sleeve 49d extends above the block for some distance for a purpose which will appear hereinafter.

The plates 49a of the supports 49 are riveted to the associated bracket 50 or 51, as the case may be, by means of four hollow rivets 52 in the manner shown, and formed in each bracket at each support is a hole 53 through which the lower end of the associated rubber block extends with some clearance. The side rails and crosspieces are secured to the shock absorbing supports by means of rivets 54 which pass through the rails and the crosspieces, and through the sleeves 49d, and each rivet is provided at its lower end with a stop washer 55. The upper ends of the two rear rivets 54 are located in countersunk holes in the side rails and are made flush with the tops of the side rails for a purpose which will appear hereinafter.

As best seen in Figs. 2 and 4, the rear crosspiece 48 is bowed downwardly at its central portion and has secured thereto a little to the right of its center, as viewed in Fig. 2, a stop pin 56. The reason for this construction will be made clear presently.

The supporting framework in the form here shown comprises two U-shaped stirrups 57 and 58 which surround the bottom and two sides of the operating mechanism, and which are secured at their upper ends to the operating mechanism by means of screws 59. The screws 59 extend through countersunk holes 60 in the stirrups and are screwed into threaded inserts 61 provided in the opposite sides of the top plate 35. The stirrups are secured together at their lower or horizontal portions by means of two laterally spaced tie bars 62 and 63 riveted to the undersides of the horizontal portions of the stirrups. The tie bars at their forward ends project beyond the forward stirrup 58 for a distance substantially equal to the width of the forward crosspiece 47 of the track; and the projecting ends of the tie bars are rounded at their outer corners and are bent downwardly a slight amount for a purpose which will appear presently. Pivotally attached to the horizontal portion of the forward stirrup 58 midway between the tie bars 62 and 63 is a locking lever 64. This lever extends rearwardly in the same plane as the tie bars 62 and 63 to a point some distance to the rear of the rear stirrup 57, and is provided intermediate its ends with a double headed friction locking pin 65 so positioned that when the locking lever is moved to its locking position in which it is midway between the tie bars, the shank of the pin will just clear the rear stirrup 57 and the upper head of the pin will overlie with slight clearance the forward edge of the rear stirrup 57. The portion of the pin disposed below the locking lever cooperates with the downwardly bowed portion of the rear crosspiece 48 of the track in a manner which will be made clear presently.

With the mounting means constructed in the manner described the track assembly is secured in place in the casing 1 during assembly of the signal, and a supporting framework is secured to each operating mechanism. When it is desired to insert an operating mechanism into the casing, the light unit L is first removed, and with the operating mechanism held in a position in which its rear end is elevated slightly, the forward stirrup is rested at the opposite ends of its horizontal portion on the two side rails 45 and 46 and the mechanism is then slid forwardly until the forward stirrup engages the front crosspiece 47 of the track assembly. When the signal reaches this position, the locking lever is rotated to its extreme lefthand position, as viewed in Fig. 2, and the rear end of the signal is then lowered to the position in which the rear stirrup rests at the opposite ends of its horizontal portion on the two side rails. The locking lever is next rotated to the right, as viewed in Fig. 2, to the position in which it engages the stop pins 56. This rotation causes the locking pin to move to the position in which its upper head overlies the horizontal portion of the rear stirrup and its lower head underlies the rear crosspiece 48, and the parts are so proportioned that when the locking pin reaches this position, the downwardly bowed portion of the rear crosspiece will cause a frictional force to be exerted on the locking pin, which force is sufficient to hold it in its locking position in which it engages the pin 56. The spacing between the two tie bars 62 and 63 is such that they will just fit between the two side rails, and it will be seen, therefore, that the tie bars cooperate with the side rails to position the operating mechanism laterally in the casing 1. The mechanism is positioned longitudinally in the casing 1 in the forward direction by engagement of the forward stirrup 58 with the forward crosspiece 47, and in the rear direction by engagement of the shank of the locking pin 65 with the rear crosspiece 48. Vertical displacement of the mechanism at its forward end is prevented by virtue of the fact that the forwardly extended portions of the tie bars underlie and engage the underside of the forward crosspiece, and vertical displacement of the mechanism at its rear end is prevented by engagement of the lower head of the locking pin with the underside of the rear crosspiece. The shock absorbing devices are so constructed that they allow a small amount of motion of the operating mechanism, usually about $\frac{1}{16}''$, in both the up and down direction. Due, however, to the fact that the area of the roundels is considerably larger than the area of the signal beam where it passes through the roundels this amount of movement is not sufficient to affect the signal beam. This amount of movement, however, is very effective in preventing the transmission of damaging vibration from the casing 1 to the operating mechanism.

After the operating mechanism has been placed in the signal casing in the manner described, the light unit L may then be snapped in place.

When it is desired to remove the operating mechanism from the signal case, the procedure is just the opposite of that described above and will be obvious from the foregoing without further detailed description.

One advantage of mounting means embodying my invention is that it is inexpensive to manufacture.

Another advantage of mounting means embodying my invention is that it permits ready replacement of one operating mechanism by another.

Although I have herein shown and described only one form of light signal embodying my invention, it is understood that various changes and modifications may be made therein within the scope of the appended claims without departing from the spirit and scope of my invention.

Having thus described my invention, what I claim is:

1. In a signal for separately projecting a plurality of beams of different colors from a single light source including optical parts for concentrating the light from said source into a light beam and color filters secured to and operated by an operating mechanism separate from said optical parts and arranged to be selectively moved by said operating mechanism into the path of said light beam and each having an area which is considerably larger than the area of the beam where it passes through the filters, whereby limited movement of the operating mechanism relative to said optical parts will not vary the optical efficiency of the signal, the combination of supporting mechanism for said operating mechanism including a resilient track assembly mounted in a position fixed with respect to said optical parts and a supporting framework secured to the operating mechanism and resting upon said track assembly, said track assembly cooperating with said supporting framework to guide said operating mechanism into position and said supporting framework being provided with means for removably securing it in a fixed position with respect to said track assembly.

2. In a light signal comprising a casing having an opening provided with a lens unit fixed to said casing, a light projecting unit fixed within said casing and capable of projecting a beam of light through a focal point which coincides with the focal point of said lens unit, and an operating mechanism for varying the color of the light emitted by said signal including a plurality of color filters which are selectively moved into said beam at the common focal point, the combination of a resilient track assembly secured within said casing, and a supporting framework secured to said mechanism and resting upon and removably secured to said track for removably resiliently supporting said mechanism within said casing.

3. In a light signal comprising a casing having an opening provided with a lens unit, a light projecting unit fixed within said casing and capable of projecting a beam of light through a focal point which coincides with the focal point of said lens unit, and an operating mechanism for varying the color of the light emitted by said signal including a plurality of color filters which are selectively moved into said beam at the common focal point, the combination of two spaced brackets secured to said casing, a track comprising side rails and front and rear crosspieces arranged in rectangular formation and supported at their ends in resilient supports secured to said brackets, the rear crosspiece being bowed downwardly and provided with a stop pin, front and rear stirrups secured at their upper ends to said operating mechanism and resting at their lower portions on said side rails, said stirrups being secured together by tie bars which cooperate with said side rails to position said mechanism laterally within said casing, said mechanism being positioned forwardly in said casing by engagement of said front stirrup with said front crosspiece, extensions on said tie bars underlying said front crosspiece to prevent vertical displacement of the forward end of said mechanism, a locking lever pivotally attached to said front stirrup and extending rearwardly past said rear stirrup and provided with a double headed pin which cooperates with said rear crosspiece when said lever is rotated into engagement with said stop pin to prevent rearward movement of said mechanism in said casing and also to prevent vertical displacement of said mechanism, said pin also cooperating with said downwardly bowed portion of said rear crosspiece to frictionally lock said lever in the position in which it engages said stop pin.

WESLEY B. WELLS.